United States Patent
Lu

(10) Patent No.: US 10,119,034 B2
(45) Date of Patent: Nov. 6, 2018

(54) WOOD PRESERVATION PRODUCTS PROTECTED WITH A DURABLE COATING SYSTEM

(71) Applicant: Ziqiang Lu, Red Wing, MN (US)

(72) Inventor: Ziqiang Lu, Red Wing, MN (US)

( * ) Notice: Subject to any disclaimer, the term of this patent is extended or adjusted under 35 U.S.C. 154(b) by 288 days.

(21) Appl. No.: 15/286,782

(22) Filed: Oct. 6, 2016

(65) Prior Publication Data
US 2017/0101542 A1   Apr. 13, 2017

Related U.S. Application Data

(60) Provisional application No. 62/239,443, filed on Oct. 9, 2015.

(51) Int. Cl.
| | |
|---|---|
| *C09D 5/14* | (2006.01) |
| *C09D 15/00* | (2006.01) |
| *C09D 131/04* | (2006.01) |
| *C08K 3/22* | (2006.01) |
| *B27K 1/00* | (2006.01) |
| *C09D 133/02* | (2006.01) |
| *B05D 7/06* | (2006.01) |
| *B05D 7/00* | (2006.01) |

(52) U.S. Cl.
CPC .................. *C09D 5/14* (2013.01); *B27K 1/00* (2013.01); *C08K 3/22* (2013.01); *C09D 15/00* (2013.01); *C09D 131/04* (2013.01); *B05D 7/06* (2013.01); *B05D 7/50* (2013.01); *C08K 2003/2248* (2013.01); *C08K 2003/2251* (2013.01); *C09D 133/02* (2013.01)

(58) Field of Classification Search
CPC ........ C09D 5/14; C09D 15/00; C09D 131/04; C09D 133/02; B27K 1/00; C08K 3/22; C08K 2003/2248; C08K 2003/2251; B05D 7/06; B05D 7/50
USPC ...................................................... 428/537.1
See application file for complete search history.

(56) References Cited

U.S. PATENT DOCUMENTS

| | | | | |
|---|---|---|---|---|
| 5,190,997 | A * | 3/1993 | Lindemann | ........... C08F 257/02 524/44 |
| 2007/0117927 | A1 * | 5/2007 | Han | ........................... C08J 9/30 525/192 |
| 2013/0313857 | A1 * | 11/2013 | Lu | ....................... B62D 25/2054 296/184.1 |
| 2016/0115337 | A1 * | 4/2016 | Lu | ............................ C08K 3/04 428/424.4 |
| 2018/0037751 | A1 * | 2/2018 | Lu | ......................... C09J 131/04 |

\* cited by examiner

*Primary Examiner* — Leszek B Kiliman
(74) *Attorney, Agent, or Firm* — Vidas, Arrett & Steinkraus, P.A.

(57) ABSTRACT

A crosslinking polyvinyl acetate (XPVAc or X-PVAc) adhesive is applied as a primer (i.e., a basecoat) or an exterior coat (i.e., a top coat) on a wood preservation product which is mainly treated with a water-based preservative. By sealing the exterior wood surfaces, the new coating system not only effectively prevents the leaching of the preservative by bonding and chelating with the unfixed preservative compounds or complexes at the surface layer, but it also significantly reduces surface aging of wood, maintains effective preservation functions, and provides a longer service life to the wood preservation product.

10 Claims, No Drawings

WOOD PRESERVATION PRODUCTS PROTECTED WITH A DURABLE COATING SYSTEM

CROSS-REFERENCE TO RELATED APPLICATIONS

This application is a utility application claiming priority to U.S. 62/239,443 filed on Oct. 9, 2015, the disclosure of which is incorporated herein by reference.

FEDERALLY SPONSORED RESEARCH

None.

SEQUENCE LISTING

None.

TECHNICAL FIELD

The invention relates to a novel method of improving the leaching and surface aging resistances and the service life of wood preservation products in adverse environments.

BACKGROUND OF THE INVENTION

Under a natural environment, wood materials made from most of tree species or natural fibers are susceptible to the attack of fungi, molds or mildews, insects, and other biodegrading agents. Especially in a warm and wet condition, an untreated wood material can readily deteriorate. For example, a wood material is subject to decay by fungi when it has a moisture content greater than 30% and stays at an environmental temperature of between about 50° F. to 90° F.

By being treated with certain chemicals, wood preservation products can effectively prevent the attack by the aforementioned biodegrading agents. In general, most of the wood preservation products are durable. They can directly be used without any paint protection.

However, the wood preservation products still absorb water and moisture during service. The absorbed water in the vessel elements, fiber tracheid, or other microstructural cavities of the wood preservation products moves freely by capillary action in a natural atmosphere, thus resulting in the swelling and shrinking of wood. Along with the season and climate changes in a natural environment, the swelling and shrinking stress in wood may make the wood preservation products: 1) to have dimensional and shape changes, 2) to develop surface cracks and splits, 3) to lose the required mechanical properties, and 4) even to be rotted down by fungi.

Another disadvantage of the most wood preservation products is the leaching of chemical preservative ingredients from wood during service. For example, Hingston and coworkers (2000) have reported that 25% of the copper element was leached out from CCA-treated pine in the first six months. The maximum leaching of copper was as high as 52% within 85 months. During service, the leaching of a preservative from the wood preservation products will not stop until the preservative reaches to a constant retention level at which few unfixed preservative compounds or complexes exist in wood. In addition, the aforementioned cracking defect may accelerate the leaching of preservatives from wood.

Most of the wood preservatives are very toxic to human beings and animals, while some are even carcinogenic. The leaching of unfixed preservatives from wood during service may be a severe threat to the natural environment and human health. Moreover, the toxic chemical leachates may corrode soil, contaminate water, and influence Earth's natural cycles. Accordingly, these leachates are a potential danger to agricultural crops, wildlife, livestock, human beings, and the natural environment.

In order to overcome these defects, some wood preservation products are coated with conventional wood paints such as lacquer, latex, acrylic, and the like (Stilwell and Musante 2004). However, most of them cannot maintain good water and weathering resistances because they are either easily peeled off from wood during service or cannot stop the wood from cracking.

Sometimes a wood preservation product can be coated with epoxy or polyurethane oil-based paints to meet a requirement for water and leaching resistances. As is well known, these oil-based coatings usually take several days to be completely cured before they can be handled or touchable. Hence, this approach would need more time and storage space to dry these oil coatings during production.

BRIEF SUMMARY OF THE INVENTION

For the invention, a wood preservation product or a preserved wood member is a wood material treated with a chemical preservative. Hence, it is also known as a preservative-treated wood product. A preservative is used to protect wood from the unexpected hazards in the natural environment. The preservative is often impregnated into wood by applying pressure higher than the atmospheric pressure. Therefore, a wood preservation product is sometimes called a pressure-treated wood product. Alternatively, a category of the wood preservation products includes a preservation method in which a wood product is treated with dipping, soaking, brushing, or the like under an atmospheric pressure. Wood preservation products usually also include preserved wood composite products. Collectively, the term of "a preserved wood member" or "a preserved member" herein refers to all wood preservation products.

Wood preservation products are normally treated with water-based preservatives, including inorganic and organic compounds or complexes. A wood preservation product can be preservative-treated lumbers, timbers, poles or posts, plywood, fiberboards, oriented strand boards (OSB), flakeboards, particleboards, glulam such as laminated veneer lumber (LVL), parallel strand lumber (PSL) and oriented strand lumber (OSL), cross laminated timber (CLT), and the like. It may also include all preservative-treated biocomposites which are made from bamboo, sisal, kenaf, jute, flax, cornstalk, bagasse fiber, or other natural fiber-based materials.

As mentioned in the prior art of U.S. 2016/0115337 by Lu, a crosslinking polyvinyl acetate (XPVAc) adherent coating has four characteristics to protect a wood or wood composite product during service. For this new coating system, XPVAc is a bifunctional material: it is not only an adhesive to wood, but it also works as a coating material for wood.

In the same prior art, four fundamental principles have been established to improve water resistance and service life of uncoated wood and wood composite products by using a durable adherent coating like XPVAc. Of course, they also apply to the wood preservation products. Moreover, XPVAc provides new features to a wood preservation product: It helps 1) fix free or unfixed preservative ingredients or compounds in wood and 2) reduce the leaching of a preservative from wood through chemical chelation and bonding.

Different from the coating materials currently used for wood preservation products, the crosslinked polyvinyl acetate coating has multiple functions: Firstly, XPVAc not only tightly bonds wood to form a protective film for the wood preservation products, but it also blocks the internal paths or avenues to water and moisture by sealing the surface porosities of wood and effectively limits the impact of the natural atmosphere. Secondly, XPVAc can keep the unfixed active preservative compounds or complexes in wood by chemical chelation and bonding, and thus reducing the leaching of a preservative into the natural environment. More importantly, the resultant wood preservation products are friendly to the natural environment and human health. Thirdly, a cured XPVAc coating is compatible with latex, acrylic, alkyd, urethane, epoxy, vinyl ester, and other wood paints. XPVAc can not only be used as a primer for the wood substrates, but it also works as a top coat material for wood preservation products. The interior layer of an XPVAc coating can act as a primer for a two-layer XPVAc coating structure. Moreover, the combination of an XPVAc primer and an acrylic, alkyd, or epoxy top coat can provide the enhanced water resistance and durability for the wood preservation products, and thus resulting in a durable and water- and leaching-resistant protective coating system for wood.

Crosslinking polyvinyl acetate (XPVAc or X-PVAc) has been extensively used as a waterborne adhesive in the wood industry. However, XPVAc has never been used as a coating material for the wood preservation products. The invention has for the first time introduced XPVAc as a durable coating for the wood preservation products. It takes advantage of XPVAc's excellent bonding property with wood and excellent water resistance. Moreover, the new coating system not only effectively reduces the cracking issue of wood during service, but it also effectively maintains the preservative retention, thus significantly extending the service life of the resultant wood preservation products.

DETAILED DESCRIPTION OF THE INVENTION

Wood fungi can be divided into decay fungi and wood-staining fungi. Decay fungi include brown rots, white rots and soft rots. Among the first two fungi, brown rots break down the cellulose component of wood, while white rots destroy both cellulose and lignin of wood. Soft rot fungi usually attack water-saturated wood in wet locations. Like other decay fungi, soft rots can also cause a serious damage to mechanical properties of wood. In contrast, wood-staining fungi such as sapstain fungi and mold fungi normally cause discoloration of the wood. Nevertheless, they do not seriously affect the strength of wood.

A wood material may be subject to the attack of insects even it is dry. The most common insects that attack wood include termites, carpenter ants and beetles. Among them, termites and carpenter ants are the two most destructive insects to wood. Termites use wood for food and shelter, while carpenter ants only use it as a shelter.

A wood or wood composite material can also be damaged by marine borers such as shipworms (e.g., Mollusca, *Bankia setacea*, Teredo, and gribbles) when it is used in and under fresh or salt water. Untreated wood is possibly infested and destroyed by marine borers in less than a year.

As aforementioned, surface cracking and chipping may be an issue to a wood preservation product in wet conditions. Firstly, the swelling and shrinking action along with the season and climate changes in the natural environment may cause dimensional and shape changes of the wood preservation products. Secondly, swelling and shrinking stress may result in surface cracks and splits of the wood preservation products. These surface aging defects may gradually migrate into the middle part and even the center area of the preserved wood materials. Accordingly, the wood preservation products produce so many cracks and splits that they cannot maintain the required strength properties. Furthermore, some wood preservation products may be further rotted out in the center part which is low in preservative retention due to the opening up of the cracks deeply into wood. Finally, the wood preservation products may be out of service because of these damages.

Another defect of the wood preservation products is the leaching of a preservative during service. Leaching out of the toxic preservatives from wood may be a severe threat to the natural environment and human health. The leaching process has the same retention-reducing direction as the retention gradient of a preservative in wood. For example, the outer layers close to the wood surfaces would lose more preservative in amount than the inner layers. Generally, the closer to the top surface of a wood preservation product, the higher the leaching of a preservative from wood.

A number of biocides, including pesticides, fungicides, moldicides or mildewicides, insecticides, herbicides, anti-sapstain chemicals and the like, have been extensively used as wood preservatives in the wood industry. In general, biocides can be divided into inorganic, organic, and organic-inorganic preservatives according to the chemical structure differences. Because it is very challenging to apply a water-based adherent coating on wood preservation products that are treated with oil-borne preservatives, an XPVAc coating system for the invention is only suitable for the wood preservation products treated with water-based preservatives. For the invention, the water-based preservatives may include waterborne biocides, water-dispersible biocides, and the combination thereof.

For wood preservation, water is the primary solvent of a waterborne preservative, while some water-unsolvable biocides can be converted into a water dispersible or emulsion system by using water dispersible co-solvents, cationic or anionic emulsifiers, alcohols, glycols, esters and other dispersing agents. For example, ammonium, amine, or other solvents are normally used for emulsifying copper-, zinc-, or other metals-based preservatives, while a wax emulsion can be used as a carrier of water-unsolvable biocides or a co-solvent for them.

In some cases, the water-based preservatives may be inorganic, organometallic, or organic compounds and complexes, including copper ion ($Cu^{2+}$ or $Cu^+$)-, chromium ion ($Cr^{3+}$ or $Cr^{6+}$)-, arsenic ion ($As^{3+}$ or $As^{5+}$)-, tin ion ($Sn^{2+}$ or $Sn^{4+}$)-, zinc ion ($Zn^{2+}$)-, and titanium ion ($Ti^{4+}$)-based salts or compounds, boron- or borate-, nitrogen-, sulfur-, chloride-, phosphate-, and silicate-based compounds, and the combination thereof. The nitrogen-based preservatives may include ammonium- and amine-containing compounds or a combination of both.

The waterborne preservatives may include acid copper chromate (ACC), alkyl ammonium compound (AAC), amine copper, ammoniacal copper citrate (CC), ammoniacal copper acetate (ACOAC), ammoniacal copper arsenate (ACA), ammoniacal copper borate (ACB), ammoniacal copper carbonate, ammoniacal or alkaline copper quaternary (ACQ, including Type B and Type D), ammoniacal copper sulfate (ACS), ammoniacal copper zinc arsenate (ACZA), chromated zinc chloride, copper bis-(N-cyclohexyldiazeniumdioxy) (Cu-HDO or copper xyligen), chromated copper arsenate (CCA) (including Type A, B and C), chromated copper boron (CCB), copper azole (including CA-B, CA-C and CBA-A), copper dimethyldithiocarbamate (CDDC), copper naphthenate (waterborne), didecyl polyoxyethyl ammonium borate (DPAB or polymeric betaine), fluorchrome-arsenate-phenol (FCAP), oxine copper (copper-8-quinolinolate or copper-8, waterborne), and the like as well as the combination thereof.

In some cases, inorganic boron preservatives (including borax, other borates, and boric acid) may be used for the invention. Boric acid, oxides and salts are effective wood preservatives, but they can be easily leached out from the preserved wood products in wet conditions. One of the advantages of boron-treated wood is low in toxicity to human beings and livestock. However, the easy leaching of inorganic boron in rain limits its application for wood preservation. Currently, one of the mostly used boron compounds in the market is disodium octaborate tetrahydrate (DOT). In contrast, zinc borate compounds are hard to dissolve in water, but it is less leachable in wet conditions than DOT and other sodium borate compounds.

In at least some cases, silicate compounds can be used as a wood preservative. For example, sodium and potassium silicates have been used as a wood preservative, respectively. In addition, potassium silicates can be further mixed with cellulose, lignin, tannin or other plant extractives and the resultant mixture can be used as a wood preservative. Like inorganic boron compounds, however, silicate compounds may be washed away from wood by water and moisture.

In some other cases, titanium compounds or complexes help reduce decay degradation of wood by fungi. For example, the weight loss of titanium oxide nanoparticles-treated wood by T. Versicolor is less than 5% by weight when the retention of nanoparticle is over 0.40 lb. per cubic foot.

In some embodiments, copper phosphate is used as a wood preservative. In order to prevent premature precipitation of copper phosphate, an acid phosphate such as monoammonium phosphate may be added. Another example may be amine phosphate which is mixed with IPBC, azoles, and other type biocides to prevent wood materials from decay.

In at least some embodiments, mercury-based preservatives may be suitable for the invention. Since mercury is a carcinogenic element to human beings and very harmful to the environment, it is preferred that a trace of mercury is added as the active biocide or co-biocide of a preservative formulation.

In some other embodiments, wood preservation products may include acetylated wood and wood composites. The acetylation of wood is made through the reaction between acetic anhydrate with the hydroxyl groups of wood to form a dimension-stable and decay-resistant product.

Alternatively, the water-based preservatives may include either some inorganic or organometallic chemicals such as copper xyligen, inorganic arsenic chemicals, inorganic copper carbonates, etc., or some organometallic biocides which can be dispersible in water or formulated as an emulsion solution from oil-borne preservatives, including the emulsion solutions of zinc naphthenate, oxine copper, copper azole, tributyltin naphthenate, tributyltin oxide (TBTO), and the like. Moreover, the water-based preservatives may be organic or non-metallic biocides that are the primary or secondary biocidal ingredients or elements and even the carriers for preservatives.

In some cases, the possible water-based organic or nonmetallic preservatives are listed as below but not limited to: 2-(thiocyanomethylthio)benzothiazole (TCMTB), 3-iodo-2-propynyl butyl carbamate (IPBC), 4,5-dichloro-2-N-octyl-4-isothiazolin-3-one (DCOI), acetic anhydrate, alkyl bezyldimethyl ammonium compounds, amine phosphonate, bifenthrin, borates, carbendiazim, chlorothalonil (CTL), chlorophenate, chloropyrifos, didodecyldimethylammonium chloride (DDAC), dodecylbenzene sulphonic acid (DDBSA), diiodmethyl-p-tolyl sulphone, imidicloprid, isothiazolinone (ITA), lindane (or gamma hexachlorobenzene), methylene bis-thiocyanate (MBT), monoethanolamine (MEA), oligomeric alkylphenol polysulfide (PXTS), orthophenylphenol (OPP), pentachlorophenol, permethrin, polymeric betaine, propiconazole, pyrethrums, quaternary ammonium compounds (i.e., quats), tebuconazole, etc. Some of the above water-dispersible preservatives have been already accepted as waterborne wood preservatives.

In some cases, mixing the above organic or nonmetallic preservatives or the above biocides with some metal elements or compounds may result in new water-borne biocides such as propiconazole-tebuconazole-imidacloprid (PTI), EL2 (a blend of 98% DCOI and 2% imidacloprid), KDS (a mixture of 43% copper oxide, 33% polymeric betaine, and 26% boric acid), KDS Type B (a solution of 56% copper oxide and 44% polymeric betaine), etc.

In some other cases, a water-dispersible preservative may be the result from combining the inorganic and organic biocides, including metallic and organometallic. The invention may include some commercially available water-dispersible preservative systems. The following trade names are included but not limited to: AMICAL, AntiBlu XP, Aura Last System, Bazooka, BriteWood S, BriteWood XL, Busan 1009, Busan 30, DAP Ready-to-use, Dowicide 1, Dowicide A, FolPet, Hylite Extra, MBT, MicoStat P, Mitrol IPBC, NaOPP, NexGen, NP-1, Premier, StaBrite R, StaBrite P, Wolman AG (Wolman L-3), Wood Life, Wood Life 111, etc.

In at least some cases, the water dispersible preservatives may include the micronized or nanonized copper technology, in which copper is ground into small particles and suspended in water. The micronized copper particles are in a range between about 1 to about 700 nm in size with an average of less than 300 nm, while nanonized copper particles are less than 100 nm in size with an average of around 30 to 50 nm. At that range these particles can penetrate into wood cell walls without being dissolved in a chemical solution. Currently, the micronized copper particles are produced as a quat biocide system (known as MCQ) and an azole biocide system (known as MCA or μCA-C) in the market, respectively. Nanonized copper, zinc, and other metal particles or other biocides may enter into the market soon, but one of the most concerns about these nanonized biocides is their potential dust pollution to human beings.

In some instances, the water-based preservatives for the invention may be used as a remedial treatment system to repair fungi- or insects-attacked areas of both non-preserved and preserved wood products. The biocides for this purpose may include pentachlorophenol, sodium dichromate, arsenic acid, borax, boric acid, copper naphthenate, copper hydroxide, lindane, sodium chloride, sodium fluoride, DOT, etc.

A remedial treatment system for wood preservation can be in a form of thixotropic gels or pastes, solid rods, or injectable biocide liquids. For example, the popular tradenames for a remedial treatment may include Pole Nu, CuRAP 20, Osmoplastic B, Osmoplastic F, and Osmoplastic CF for thixotropic gels or pastes; IMPEL rods, FluroRods, and Cobra rods for solid rods; and Hollow Heart and Hollow Heart CF for injectable biocide liquids.

In some other instances, the invention also includes some fumigants which are used for wood preservation. The fumigant treatment of wood is another effective method to kill the infestation of wood by fungi, insects, and other biodegrading agents. The normal fumigants suitable for wood preservation may include 1,3-dichloropropene, chloropicrin, dazomet (tetrahydro-3,5-dimethyl-2H-1,3,5-thiadiazine-2-thione), dibromochloropropane (DBCP), formaldehyde, hydrogen cyanide, iodoform, metam sodium, methyl bromine, methyl isocyanate (MIC), methyl isothiocyanate (MITC), phosphine, sulfuryl fluoride, etc. Among them, chloropicrin, sulfuryl fluoride, and MITC can be used as a remedial biocide to treat decayed wood materials. The popular fumigants for wood preservation may include Basamid, Dura Fume, G Fume 96, L Fume 33, Mitc-Fume, Pol Fume, WoodFume, Vapam, etc.

In at least some instances, broad spectrum pesticides for agricultural crops may be directly used as or converted into a water-based wood preservative for the invention. These pesticides may include the following biocides but are not limited to: avermectins such as abamectin, doramectin, and ivermectin; carbamates such as aldicarb, carbofuran, carbaryl, methomyl, and oxamyl; derivatives of dinitroanilines such as benfluralin, oryzalin, and trifluralin; neonicotinoids such as acetamiprid, clothianidin, and imidacloprid; organochlorides such as aldrin, dieldrin, endrin, chlordane, and endosulfan; organophosphates such as diazinon and malathion; pyrethroids such as allethrin, bifenthrin, and permethrin; ryanoids such as chlorantraniliprole, cyantraniliprole, and flubendiamide; spinosads such as lepidoptera, diptera, and coleoptera; derivatives of urea such as benzoyl urea, phenyl urea, and sulphonyl urea; etc.

For a wood preservation product, the wood material can be solid lumbers, timbers, logs or poles, plywood, fiberboards, OSB, flakeboards, particleboards, LVL, PVL, OSL, CLT, and the like. It can also be made from natural fiber-based composites, including bamboo, sisal, kenaf, jute, flax, cornstalk, bagasse fiber, and the like.

Before a preservative treatment, green wood normally undergoes through peeling, drying, sawing, incising, cutting and framing, and other steps for preparation. Sometimes green wood is directly treated with a preservative without going through an air- or kiln-drying process. In order to increase the penetration of a preservative into wood, incising the surface layers is conducted. For the incising process, some shallow, silt-like holes are created on the surfaces of wood before the pressure treatment. The incising depth normally varies from ⅕ inch to ¾ inch, depending on wood species, the required retention and depth of a preservative. However, incising may significantly decrease the strength properties of treated lumbers and timbers.

After the above preparations, a wood lumber or wood composite is generally treated with a preservative by brushing, spraying, dipping, soaking or steeping, and the like under a normal atmospheric pressure condition (also called a non-pressure treatment). Sometimes, heat is introduced to improve penetration of a preservative into wood. For example, a hot bath (also called Gedrian's Bath) can be used for wood preservation. Since wood may be treated with a preservative through the above processes under a normal atmospheric pressure, a preservative mostly penetrates into the surface layers of wood. Moreover, a longer treating time may be needed to soak a preservative into a depth of less than two inches.

Because of the faster speed, deeper penetration of a preservative to wood, easier treatment handling, suitableness to broad wood species, and other advantages, pressure treatments have been extensively used for wood preservation. Currently, the mostly used pressure treatment processes include the full-cell, empty-cell, modified full-cell, fluctuation pressure process, high-pressure sap displacement system, and the like, which may be derived or modified from the Bethell, Reuping, or Lowry process. All these treating processes are suitable for the wood preservation products used for the invention.

The full-cell process is applied when the maximum retention of a preservative is required for a treated wood material. Generally, the initial and final vacuum steps in the full-cell process can be modified according to the wood species, material size and volume, required retention of a preservative, and the like. The empty-cell process is used in order to achieve deep penetration but a low preservative retention for wood preservation. In the empty-cell process, the wood is pretreated with compression air for a short time to fill into the cell lumens or other porosity parts of wood. The air pressures applied normally range from 25 to 100 lb./in$^2$. The empty-cell process can also be conducted without an initial air pressure or a vacuum.

For wood preservation, treating pressures and preservative temperatures are the two important treating parameters for production. The treating pressure is usually controlled in a range from 50 to 250 psi, depending on wood species and the target retentions. For instance, the preferred pressure for Douglas fir and red wood is 150 psi and 125 psi, respectively, while a higher pressure of up to 250 psi can be used for oak species. But low pressures may also work for these species.

A variation of treating temperatures are recommended for different preservatives, wood species, and end products. Generally, high treating temperatures should be avoided for the water-based preservatives in order to prevent premature precipitation. According to American wood preservative association (AWPA), a preservative temperature during the impregnation stage is recommended to be less than 120° F. for ACC and CCA and less than 150° F. for ACA, CC, ACQ, ACZA, CBA-A and CDDC. The treating temperature for inorganic compounds such as borax or boric acid should not exceed 200° F.

In some cases, a rinsing treatment is recommended after the preservative treatment in order to reduce extra preservative compounds precipitated on the exterior surfaces of wood. For instance, an impregnated wood material is further cooked by hot water or steam to remove the unfixed preservative compounds on the surface layers of wood. The water temperature is in a range between about 100° F. to about 240° F., depending on the preservative and wood types and the target retentions. The cooking period may be in a range between about 5 to about 60 mins.

Alternatively, the pressure-treated wood products can be rinsed in a pressure vessel or tank or a closed facility to remove free and unfixed preservative compounds on wood. The impregnated wood products can be quickly rinsed with hot water from about 40° F. to about 200° F. and under a pressure of about 10 psi to about 80 psi. The rinsing procedure may last for about 5 min to about 30 min each time and can be repeated two or three times, depending on the retention levels, preservative type, wood species, product end uses, and other factors. The above post-rinsing steps help improve the adhesion between XPVAc and wood.

For wood preservation, a preservative may be fixed by wood constituents through reacting with 1) cellulose and hemicellulose, 2) lignin, and 3) other non-cellulosic constituents such as tannin, resin acid, and proteins and 4) through physical adsorption of the active preservative ingredients by wood constituents. The first three groups are mainly caused by chemical fixation, while the last one results in the physical fixation of a preservative in wood.

For chemical fixation, the active ingredients or compounds of a preservative can be fixed by chemical reaction with wood in compound middle lamella [including middle lamella (ML) and primary wall (P)], secondary wall (S) such as S1 and S2 layers, and cell corners. On the other hand, physical fixation of a preservative is mainly resulted from physical adsorption by wood. In this way, the preservative solution is firstly absorbed by wood. The preservative is then precipitated in the cavity parts of wood when water is removed. Hence, the physically fixed preservatives in wood are easier to remove from wood by water than the chemically fixed ones.

A wood preservative mostly exists in the outer layers of wood after the impregnation treatment (i.e., a pressure treatment) or by surface coating. Generally, the preservative retention of a wood preservation product is gradually decreased from the outer layers of wood to the inner parts. In general, there are few or no preservative compounds in the center part, depending on the impregnation depth of a preservative, treating pressure, treating time, the treating thickness or dimension of a wood material, and other factors.

A large amount of the preservative in a wood preservation product may be mechanically fixed in the porosity parts of wood such as the lumen parts of vessel elements and fiber tracheid, but it can even penetrate into cell walls. There is also chemical fixation in wood by some preservatives, but sometimes the physical fixation may be dominant. Hence, the unfixed and fixed preservative compounds or complexes may coexist in wood.

There is a tendency to lose the free and unfixed preservative from wood during service. Even some fixed preservative compounds or complexes at the surface layers of the wood preservation products may be gradually leached out. Obviously, the wood preservation products would lose more preservative ingredients at the surface layers of wood and the layers close to the surface than the center part during service.

XPVAc is a two-part adhesive, in which the polyvinyl acetate emulsion is the main part, while the other part is the catalyst. It can also be a one-part adhesive, in which the catalyst is already premixed. However, the former may provide better wet strength and have a longer shelf life than the latter.

As disclosed by the prior art of US 2016/0115337, the waterproofing composition of XPVAc is normally comprised of a polyvinyl acetate adhesive, a catalyst, a cross-linking agent, a surfactant, a colorant, and the like. The same prior art has also described in detail the ingredients or components of the XPVAc coating.

For the invention, the catalyst for XPVAc may further include: 1) metal ion compounds, including chromium nitrate, aluminum nitrate, aluminum chloride, iron trichloride, zirconium nitrate, potassium dichromate, chromic perchlorate, calcium chloride, sodium persulfate, potassium persulfate, basic zirconium oxychloride, etc., 2) nonmetallic chemicals, including ammonium persulfate, hydrogen peroxide, oxalic acid, antimony trichloride, vanadium oxychloride, bismuth oxychloride, tertbutyl persulfate, etc., and 3) the combination of these compounds or chemicals.

The curing of crosslinking polyvinyl acetate is driven by a loss of moisture in the emulsion and/or when the moisture is dried out. Since the most porosity at the surface layers of a wood preservation product has been filled by the preservative, less XPVAc coating may be needed to seal the surface layers of wood, compared with a wood product without a preservative treatment. For the invention, the solid content of a crosslinking polyvinyl acetate adhesive can be in a range between about 20 to 60% by weight.

After the preservation treatment, the wood preservation products can be air- or kiln-dried for a certain period to reach a moisture content of about 20% or less. The dried wood and wood composites are then coated with an XPVAc adhesive. The XPVAc coating is quickly cured at room temperature. In addition, the curing process of XPVAc can be accelerated with steam heating, ceramic heating, IR heating, and other suitable heating methods.

Generally, copper, chromium, arsenic, zinc, and other metal or metalloid ions can act as a center atom to form two or multiple bonds with oxygen-based ligands such as the molecules or polymers containing hydroxyl groups (—OH), carboxylic or carboxylate groups (—COOR), and other oxygen-based organic ligands, thereby resulting in a chelation or coordination structure.

In some cases, the acetate groups (—OOCCH$_3$) and the hydroxyl groups of XPVAc adhesive or coating work as a polydentate (or multiple bonds) with certain metal or metalloid ions or atoms. As a chelant or chelator, XPVAc can form a chelating or coordination structure with copper-, chromium-, arsenic-, zinc-, tin-, titanium-, cobalt-, cadmium-, mercury-, or other metal or metalloid-based preservatives, which helps fix the free preservative compounds or complexes in wood.

In at least some cases, XPVAc is also an active chelant or chelator to certain inorganic elements or compounds such as boron-, iodine-, nitrogen-, sulfur-, chloride-, phosphate-, or silicate- based compounds or complexes. For example, XPVAc is normally a very good chelant to most boron compounds, while it can also chelate with ammonium- and amine-based compounds.

In some other cases, XPVAc may form a chelating or coordinate structure with the mixtures or combination of the above metal salts or compounds and non-metallic inorganic compounds. The XPVAc coating may effectively fix the free or unfixed preservative ingredients or compounds at the surface layers and maintain them in wood. Moreover, the unfixed preservative ingredients or compounds existing in the internal channels of wood can be kept in wood due to that the XPVAc coating film seals the surface layers of wood by blocking the porosity passages in wood at the surface layers to the natural environment.

For the invention, the XPVAc coating must be coated as the first layer on wood (i.e., the primer) in order to maintain a durable performance. This new coating system may need to have at least two coating layers during the outdoor service. It may include the following basic coating structures: 1) XPVAc coating is used as the same on each layer. For instance, XPAc is used as the first layer to cover wood. The second layer of XPVAc is then applied over the first layer; 2) XPAc coating is used as the primer, while the second layer (or the exterior layer) is acrylic; 3) alkyd is used as the second layer above the primer of XPVAc; 4) a one-part polyurethane coating is used as the exterior layer over an XPVAc layer; 5) an epoxy coating can be used as the second layer to cover the first layer of XPVAc; and 6) other water resistant wood paints such as EPI, two-part polyurethane, or the like are applied as an outer layer on XPVAc. The last five coating structures are also called a hybrid coating composition.

For the aforementioned coating layer structures, XPVAc and regular wood paints can be further applied to the XPVAc primer on the wood preservation products, respectively. For example, the second XPVAc coating is applied on the primer as an exterior layer. Alternatively, acrylic coating can be coated on the XPVAc primer. Another option is to further apply an oil-based coating such as alkyd or an adhesive-like coating (e.g., polyurethane, vinyl ester, or epoxy) on the above primer. Therefore, at least two layers are applied on wood. Moreover, the third or multiple coats can be further applied on these two coating layers. When high water resistance is required, two layers of XPVAc are firstly applied on wood, and then the third or multiple layers of various water resistant coatings can be added.

In some embodiments, a water resistant coating for wood may consist of acrylic, alkyd, polyurethane, epoxy resins (including bisphenol A, bisphenol F, novolac, aliphatic, and glycidylamine epoxy), vinyl ester, EPI, or the like, while other painting materials such as silicone polyester, silicone alkyd, polyvinyllidene fluoride (PVDF), or the like can also be applied.

In some other embodiments, XPVAc can be coated on at least one of the exterior surfaces of the preserved wood member by roll coating, spraying, brush coating, or other suitable facilities. Before contacting with other wood surfaces, the XPVAc coating is dried out or cured under an ambient condition, or heated to accelerate its curing by an IR heating facility, a heating tunnel, or other heating methods.

In at least some embodiments, some wood preservation products may secrete resin-like extractives from wood due to the opening of oil cell lumens. The resin secreting issue may occur for certain softwood and hardwood species, including aleppo pine, loblolly pine, longleaf pine, maritime pine, ponderosa pine, scots pine, slash pine, sumatran pine, and other pines, balsam fir, larch, red spruce, etc. Since the resin substances may interfere with the bonding of XPVAc with wood, a pretreatment is necessary in order to remove them from the surface layers of the wood preservation products. One of the effective treatments may be to use some organic solvents such as acetone, alcohols, hexane, petrol ether, toluene, xylene and the like.

During manufacturing, plywood already undergoes multiple cycles of wet and heating treatments, including log-bathing, veneer drying, glue coating, hot pressing, and other processes. In addition, most of veneer materials have a back cracking defect caused by the cutting knife of a rotary lathe machine during peeling veneer from wood logs. The preservative impregnation process may make the defect so bad that a number of cracks or splits are developed on the preserved plywood. For better covering by XPVAc coating, these surface cracks need to be repaired in advance. This defect can be sealed with a wood putty material such as Bondo, polyester putty, or the like. In order to provide durable protection for the preserved plywood, it is preferred that two basecoats of XPVAc are applied on the preserved plywood before applying the exterior layers of acrylic, alkyd, epoxy, vinyl ester, polyurethane, or the like.

In some cases, an enhanced treatment may be needed if XPVAc-coated wood preservation products are used for ground contact during service. It is recommended that a wood preservation product should be firstly coated with two layers of XPVAc coating. The cured XPVAc coating layers are further coated with acrylic, alkyd, epoxy, polyurethane, EPI, or other water resistant coating before the resultant coated product directly contacts the ground.

In at least some cases, special metal fastening materials may be required for the coated wood preservation products in order to avoid rust and corrosion of metals during service. It is recommended that certain metals or metal alloys such as copper, silicone bronze and stainless steel be used for fastening or connecting the coated wood preservation products, depending on the preservative type and retention, end use, and other factors. Alternatively, galvanized steel or iron nails, screws, and staples may be suitable for the coated wood preservation products.

Most of the wood preservation products treated with a waterborne preservative for above ground use usually can last for about 10 to 30 years in outdoor conditions without any maintenance. With this new coating system, XPVAc-coated wood preservation materials can significantly reduce cracking and chipping and have an excellent water resistance, thus resulting in a longer service life. By estimation, the coated wood preservation products can last for about 30 to about 50 years by running several recoating intervals with acrylic, alkyd, epoxy, vinyl ester, polyurethane or the like during service.

Except for the advantages of an improved water resistance, a better leaching resistance, a better surface aging resistance, and the like, the coated wood preservation products also provide flexibility in color and aesthetics to the natural environment. Unlike the most common greenish color or the color resulted from a preservative for most of the uncoated wood preservation products in the commercial market, the XPVAc-coated wood preservation products can provide a number of choices or selections in color due to the fact that XPVAc is compatible to many wood coating materials. Moreover, the new coating system also provides a value-added wood product potentially with a longer service life but less deforestation for lumbers and timbers.

Enhanced with the new coating system, the surface-protected wood preservation products can be used for a number of indoor or outdoor applications, including deck floors, sub-floors, picnic tables, benches, trash bins, fences, flower stands or baskets, sidings, soffits, porch ceilings, wood tiles, doors, windows, sheathing, roof boards, garage walls, walls and decks for RV, walls and sidings for barns and sheds, cooling towers, utility poles, piles, posts, ties, bird houses, outdoor mailboxes, outdoor frames, outdoor decorations and furniture, marine decking, highway anti-acoustic boards, sign/ad boards, truck trailer walls, truss beams, wood bridges, etc.

EXAMPLES

In the following examples, all preserved wood samples were initially wet, but they were air-dried to be about 20% and 12% or less in moisture content, respectively, before being applied with XPVAc and 100% acrylic as the first layer. For most of the coated wood preservation products, XPVAc was used as a primer or exterior coating. For hybrid coating structures in some examples, a 100% acrylic, alkyd, or polyurethane coating was used. After being coated, all test samples were stored at room conditions for one week. They were then placed in an outside Minnesota environment for a field test.

Examples 1 to 4 used the same preservative formula of acid copper chromate (ACC or AC2). In addition, a micronized copper technology was applied for the same formula. The ACC contained 31.8% copper oxide and 68.2% chromium trioxide. The resultant preservative samples were designed for the above ground use and had a preservative retention of 0.06 lb./ft³.

The invention may be further clarified by reference to the following examples, which serve to exemplify some of the preferred embodiments, but not to limit the invention in any way.

Example 1

Two pieces of 10 inch wide by 1½ inch thick by 24 inch long southern yellow pine (SYP) lumber samples were purchased commercially. Both had been pressure-treated with ACC. One sample was longitudinally divided into two half zones: One half was used as received, while the other half was coated with one layer of XPVAc Deckbond LS brand coating. The wet coating thickness of XPVAc was controlled to be about 10 to 12 mils. The other sample was firstly coated with XPVAc at the same wet coating thickness. After the XPVAc coating was completely cured, the right half sample was kept as one layer of XPVAc coating, while the left half sample was coated with a yellow alkyd coating as the exterior layer.

The coated samples were both mounted with galvanized screws on a triangle-shape wood frame stand. Both samples were fastened side by side at the top ends, while their bottom ends were kept about 15 inches away. The coating surface of each sample faced up and was tilted with 30° to the vertical line in order to drain off water and water vapor during exposure.

After three-year outdoor exposure, the uncoated half sample faded in color. The original green color had disappeared and turned into grey. In addition, a lot of cracking had been developed on the top face. For the coating sections of both samples, however, there was no cracking on XPVAc and alkyd coatings. In addition, the half-coated sample was deformed, while the fully coated sample had no deformation.

Example 2

A piece of 2 foot-by-2 foot southern pine plywood pressure-treated with ACC was divided into four equal quarters. The preserved plywood had some cracks on the surface due to the multiple wetting and drying cycles created by the manufacturing and the preservation treatments, respectively. The preserved plywood was ½ inch in thickness. The first and second quarters were located at the same side, while the last two quarters were at the other side on the same surface. The first quarter of the plywood was uncoated and used as a control; the second was coated with a layer of acrylic coating; the third, with a layer of XPVAc. The fourth had two coating layers: The first coat was XPVAc, while the second one was acrylic. The plywood sample was mounted with galvanized screws on a vertically tilted standing pallet for outdoor exposure.

After having been exposed for two and a half years, both of the first and second quarters had some cracks on the uncoated and acrylic coated surface, the third had less cracks on the XPVAc-coated surface, whereas the fourth had few cracks on the two-layer hybrid coatings.

Example 3

A total of five ACC-preserved southern pine lumber samples were used for this experiment: the first and second samples was 1.5 inches thick by 2.5 inches wide by 14 inches long, the third, 2 inches by 4 inches by 24 inches, while the fourth and fifth, 1.5 inches by 6 inches by 11 inches. The first two samples had no coating and were used as a control. Both controls had a moisture content of about 9%. The third one was coated with one layer of XPVAc as a primer. After the coating was cured, the second layer of acrylic was applied on it. For the two six inch-wide samples, one was coated with one layer of acrylic coating, while the other was first coated with one layer of XPVAc as a primer and then coated with one layer of acrylic after the XPVAc was completely cured. All the coated and uncoated samples hung on a wood shelf stand outdoors and were kept at least two feet away from the ground.

After one-month exposure, minor cracking occurred on both controls. After one-year exposure, many tiny cracks were developed on most of the surfaces for both controls. Furthermore, they were deformed in shape and some cracks started penetrating into wood. The original green color turned into light brown. In contrast, the XPVAc-coated four inch-wide sample had no cracking and no deformation, and the exterior acrylic coating was intact after two-year exposure. For the six inch-wide lumber samples, however, the one coated with acrylic had cracks on the facing-up end and both faces and edges. Thus far, all samples coated with XPVAc as a primer have remained intact and had no cracks on wood after two-year exposure.

Example 4

Three pieces of 2 inch thick by 4 inch wide by 12 inch long ACC-treated southern pine studs were used. The stud samples were firstly coated with a layer of XPVAc. An acrylic coating was then applied on the cured XPVAc primer as the exterior layer. The coated studs were mounted on a box pallet with regular iron nails. The nail heads stayed on wood and were exposed exteriorly. The resultant stud pallet was about four inch in height. It was then placed on ground and tilted at about 10° to the horizontal line in order to drain off water and water vapors during outdoor exposure.

After having been exposed for two years, the exterior coating of the above ACC-preserved studs were intact. There was no cracking, mildew, and decay existing on these coated studs, but all nail heads were corroded with rust.

Example 5

Four pieces of CCA-treated 2 inch thick by 4 inch wide by 24 inch long southern pine lumbers were used in this example. The nominal retention of CCA in wood was 0.60 lb./cu ft. The CCA preservative consisted of 65.5% chromium trioxide, 18.1% copper oxide and 16.4% arsenic pentoxide. Each lumber sample was vertically fastened with galvanized screws as a leg on two pieces of 15 inch by 15 inch hardwood frames at one corner to form a flower stand. Both frame pieces were one foot apart and horizontally paralleled to each other.

Before assembly, one leg of the stand was used as a control, while the second one was coated with acrylic coating. The last two legs were firstly coated with one layer of XPVAc as a primer. After the XPVAc coating was completely cured, one leg was further coated with acrylic, while the other was coated with alkyd.

After three-month outdoor exposure the uncoated and the acrylic-coated lumber legs started cracking on the ends and sides. After one-year exposure, both had developed a lot of cracking although there were no mildew and decay. However, the two legs with the XPVAc primer were intact after one-year exposure. In addition, both legs had neither mildew or decay, nor did they show any cracks, checks, and other defects.

Example 6

Four pieces of pressure-treated 1¼ inch thick by 6 inch wide by 24 inch long southern yellow pine deck board samples were used for this experiment. All the deck samples were treated with a copper azole preservative, consisting of micronized copper and tebuconazole. The treated samples had a copper azole retention of about 0.15 lb./ft$^3$ and were designed for the above ground application. Before being coated, each sample had been air-dried until its moisture content was about 20%.

Among these samples, one was used as a control and divided into two halves longitudinally. One half was used as received, whereas the other half was coated with acrylic. The other three samples were first coated with XPVAc. After the XPVAc coating was completely cured, the first and second ones were further coated with acrylic, while the third one was coated with alkyd at the top half and with a polyurethane coating at the bottom half.

All these samples were mounted with galvanized screws on both sides of a triangle-type wood frame stand. At each side of the stand, two samples were installed side by side. Each sample was tilted about 10° to the vertical line to help drain off water and moisture during exposure.

After three-month outdoor exposure, minor cracks appeared on the top end of the control sample no matter whether it is coated or not, while there was no crack on all XPVAc-coated samples. After one-year exposure, the uncoated half of the control sample had many cracks on the top surface and the top end, while many cracks were produced on the top end of the coated half, but there were few cracks on its coated surface. In contrast, all XPVAc-coated samples have remained intact and had neither cracks nor mildew or decay after one-year exposure.

The above XPVAc-coated wood preservation products are herein described in certain embodiments which are used only for a presentation. The descriptions may be subject to changes, modifications, and substitutions without falling out of the spirit of the invention.

I claim:

1. A chemical preservative composition for wood comprising:
    a water-based biocide, selected from the group consisting of a waterborne biocide, a water-dispersible biocide, or the combination thereof;
    said composition further including a crosslinking polyvinyl acetate protective coating which may be applied to bond and seal wood surfaces;
    said crosslinking polyvinyl acetate protective coating chelating with the active water-based biocide;
    wherein the crosslinking polyvinyl acetate protective coating at least consists of a polyvinyl acetate-based adhesive resin, a crosslinking agent, and a catalyst before being cured; and
    wherein the protective coating has a minimum Fruehauf wet shear strength of 325 psi when applied to wood and cured.

2. The chemical preservative composition of claim 1, wherein the biocide is a copper-, chromium-, arsenic-, zinc-, tin-, or titanium-based compound or complex, a boron-, nitrogen-, sulfur-, chloride-, phosphate-, or silicate-based compound or complex, or the combination thereof.

3. The chemical preservative composition claim 1 having a minimum biocide retention of 0.005 lb. per cubic foot.

4. The chemical preservative composition of claim 1, wherein said crosslinking polyvinyl acetate adhesive has a solid content of at least 20% by weight.

5. The chemical preservative composition of claim 1, wherein said crosslinking polyvinyl acetate adhesive has a minimum Fruehauf wet shear strength of 525 psi when applied as a top coating layer to wood.

6. A wood product including an exterior surface, at least a portion of said exterior surface being coated with a chemical preservative composition for wood comprising:
    a water-based biocide, selected from the group consisting of a waterborne biocide, a water-dispersible biocide, or the combination thereof; said biocide including a copper-, chromium-, arsenic-, zinc-, tin-, or titanium-based compound or complex, a boron-, nitrogen-, sulfur-, chloride-, phosphate-, or silicate-based compound or complex, or the combination thereof;
    said composition further including a crosslinking polyvinyl acetate protective coating to bond and seal wood surfaces; said crosslinking polyvinyl acetate protective coating chelating with the active water-based biocide; wherein the crosslinking polyvinyl acetate protective coating includes a crosslinking agent and a catalyst before being cured; and wherein the protective coating has a minimum Fruehauf wet shear strength of 325 psi when applied to wood and cured.

7. The wood product of claim 6, including a first coat of said crosslinking polyvinyl acetate applied to said exterior surface, and a second coat of other water resistant coatings selected from the group consisting of acrylic, alkyd, lacquer, polyurethane, and epoxy applied after curing of the crosslinking polyvinyl acetate.

8. A method for protecting a wood product having an exterior surface, comprising the steps of:
    a) coating at least a portion of said exterior surface of said wood product with a chemical preservative composition for wood comprising a water-based biocide, selected from the group consisting of a waterborne biocide, a water-dispersible biocide, or the combination thereof; said composition further including a crosslinking polyvinyl acetate protective coating is applied to bond and seal wood surfaces; said crosslinking polyvinyl acetate protective coating chelating with the active water-based biocide; wherein the crosslinking polyvinyl acetate protective coating includes a crosslinking agent and a catalyst before being cured;
    b) applying a second coating of the chemical preservative composition; and
    c) applying an acrylic or epoxy coating over the coatings.

9. The method of claim 8, wherein said biocide includes a copper-, chromium-, arsenic-, zinc-, tin-, or titanium-based compound or complex, a boron-, nitrogen-, sulfur-, chloride-, phosphate-, or silicate-based compound or complex, or the combination thereof.

10. The method of claim 8, wherein the crosslinking polyvinyl acetate adhesive is coated on wood when the moisture content of the preserved wood member is less than 30%.

* * * * *